United States Patent [19]

Nicia et al.

[11] 4,451,115

[45] May 29, 1984

[54] DETACHABLE COUPLING FOR OPTICAL FIBRES

[75] Inventors: Antonius J. A. Nicia; Cornelis J. T. Potters; Antonius H. L. Tholen, all of Eindhoven, Netherlands

[73] Assignee: U.S. Philips Corporation, New York, N.Y.

[21] Appl. No.: 165,886

[22] Filed: Jul. 3, 1980

[30] Foreign Application Priority Data

Jul. 19, 1979 [NL] Netherlands ................. 7905610

[51] Int. Cl.³ .............................................. G02B 5/14
[52] U.S. Cl. ............................................... 350/96.18
[58] Field of Search ................ 350/96.18, 96.2, 96.21

[56] References Cited

U.S. PATENT DOCUMENTS

| 3,902,784 | 9/1975 | Dakss et al. | 350/81 |
| 3,950,075 | 4/1976 | Cook et al. | 350/96.18 |
| 4,265,511 | 5/1981 | Nicia et al. | 350/96.18 |

Primary Examiner—Eli Lieberman
Attorney, Agent, or Firm—Marc D. Schechter

[57] ABSTRACT

A detachable connector for coupling a pair of optical fibers includes two connector elements detachably connected to a connector holder. Each connector element includes a cylindrical housing, a spherical lens, a disc-shaped fiber holder, means for adjusting the axial displacement of the fiber holder in the housing, and means for adjusting the displacement of the holder perpendicular to the axis. The spherical lens is mounted in a conical bore in the housing, adjacent the fiber holder.

3 Claims, 4 Drawing Figures

DETACHABLE COUPLING FOR OPTICAL FIBRES

BACKGROUND OF THE INVENTION

The invention relates to a connector for detachably coupling a pair of optical fibers. The connector comprises two connector elements and a connector holder. Each connector element and the connector holder comprise means for detachably connecting the connector element in the connector holder.

Couplings of this kind are used in optical telecommunications systems, in which information is transmitted from one location to another location in the form of light pulses via optical fibers. The information to be transmitted (in this case light pulses) should be attenuated as little as possible. The described coupling forms an important link in the communications system and should attenuate the light pulses to be transmitted as little as possible. To this end, a coupling described in U.S. Pat. No. 3,902,784 has parts which have been manufactured with a very high precision in order to couple the optical fibers (whose optical core has an effective diameter of 100 µm or smaller) with low light losses. The required precision makes the couplings expensive and mechanically vulnerable which are, of course, drawbacks.

SUMMARY OF THE INVENTION

It is an object of the invention to provide a coupling which can be simply manipulated and which is composed only of standard parts, manufactured only with standard precision, so that they are not expensive.

To this end, the invention provides a detachable connector, for coupling a pair of optical fibers, comprising two connector elements and a connector holder. Each connector element and the connector holder comprise means for detachably connecting the connector element in the connector holder. Each connector element comprises a cylindrical housing, a spherical lens, and a disc-shaped fiber holder. The fiber holder has a bore which is directed perpendicular to a flat side of the disc and which serves for securing a fiber end. The cylindrical housing has a reference end face, a circular cylindrical bore which opens therein and which is directed transverse thereto. The cylindrical bore in the cylindrical housing has a narrowed portion adjacent the reference end face, in which the spherical lens is positioned, and a rim which defines a reference face, parallel to the reference end face, on which the fiber holder bears. The fiber holder leans on the rim by way of adjusting means, which allow the fiber holder to be displaced axially in the bore, and positioning means, for displacing the fiber holder in a direction parallel to the reference face. The reference end faces of the connector elements contact each other after coupling by means of the connector holder.

In the connector according to the invention, a fiber end mounted in the fiber holder is always directed substantially perpendicular to the reference end face of the connector element. When two connector elements are arranged so that the reference faces contact each other, the fiber ends mounted in the fiber holders are always substantially parallel to each other.

An end face of a fiber end can be positioned at the focal distance from the spherical lens by the adjusting means. The positioning means are used to position the end face of the fiber on an optical axis of the spherical lens whose direction extends perpendicular to the reference end face.

When the fiber ends have been positioned in the described manner in both connector elements, the losses during light transmission from one fiber end to the other end will be minimized. The light beam emerging from one spherical lens is substantially parallel, so that it is focused on the end face of the other fiber by the other lens. The loss occurring will be determined by the unavoidable spherical abberation due to the use of the spherical lenses, and by the distance between the optical axes of the spherical lenses. The distance between the optical axes is determined by the unavoidable, but in this case acceptable, tolerances in the parts of the coupling.

The losses which always occur due to reflections from lens surfaces and end faces of the fiber ends can be limited in known manner by provision of anti-reflective coatings and by using, for example, a coupling liquid which is applied between the lens and the fiber and which has a refractive index adapted to the refractive index of the lens and the core of the optical fiber.

Furthermore, the end faces of the fibers are located within the housing, so that the risk of damaging or contaminating the end face is eliminated. Damaging or slight soiling of the lens surface is less critical since the area of the light-transmitting lens surface used is much larger than the surface area of the end faces of the fibers. Furthermore, each lens is situated completely within the housing, so that the risk of damage is almost nil.

BRIEF DESCRIPTION OF THE DRAWING

FIG. 2b is a plan view of an embodiment of a lens clamp for the coupling shown in FIG. 2a.

DESCRIPTION OF THE PREFERRED EMBODIMENTS

Figure 1:
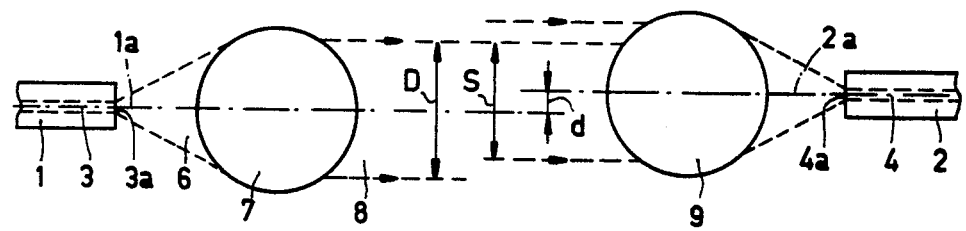
FIG. 1 illustrates the coupling principle used in the invention.

FIG. 1 shows two ends 3a and 4a of optical fibers 1 and 2. The optical axes 1a and 2a are assumed to be parallel, but are offset at a distance d from each other. The distance d is on the order of magnitude of the diameter of the optical cores 3 and 4 (up to 100 µm) of the optical fibers 1 and 2.

If the fibers 1 and 2 in FIG. 1 were directly coupled to each other (the end faces 3a and 4a being arranged in the same plane while maintaining the same offset), the light transmission between the optical core 3 and the core 4 (the coupling efficiency) would be (substantially) nil. However, with lenses 7 and 9, the light beam 6 emitted by the fiber core 3 is refracted by spherical lens 7 so as to form a substantially parallel light beam 8 having a diameter D, because the focal point of the lens 7 is situated at the end face 3a. Similarly, the focal point of the lens 9 is situated at the end face 4a. The diameter D is a factor 20 to 100 times larger than the diameter of the optical core 3. A part S of the beam 8 created by means of the lens 7 is accepted by the optical core 4a via a lens 9 and is focussed on end face 4a. It will be clear that by means of such an arrangement of lenses 7 and 9 and end faces 3a and 4a, a higher coupling efficiency can be achieved in comparison with a direct coupling, given the tolerances between the fiber ends 1 and 2. However, the optical axes 1a and 2a must be substantially parallel. The coupling efficiency is optimum when the optical axes 1a and 2a coincide.

Figure 2A:
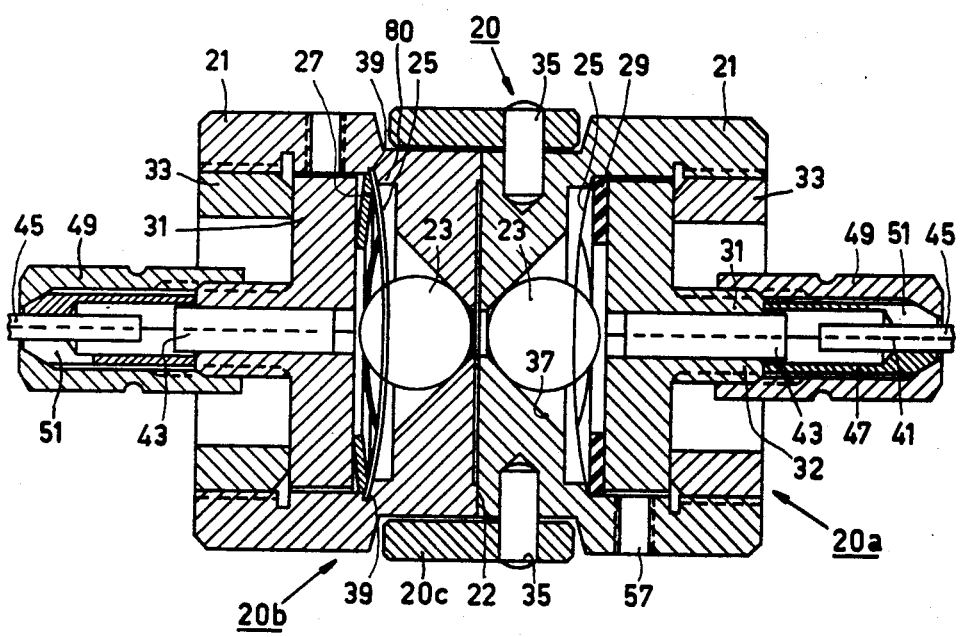
FIG. 2a is a sectional view of the coupling according to the invention.

FIG. 2a shows a connector 20 according to the invention comprising two connector elements 20a and 20b and a connector holder 20c. Each connector element 20a or 20b is composed of a circularly cylindrical housing 21, a spherical lens 23, a lens clamp 25, adjusting means comprising an adjusting ring 33 and a resilient member in the form of a cup-spring 27 or an elastic plastic ring 29, a disc-shaped fiber holder 31, and some further parts to be described below.

In the housing 21 there are secured two pins 35 which form a bayonet snap coupling in conjunction with slots which are provided in the connector holer 20c (which is shaped as a ring). The connector element 20a is rotated through one quarter of a turn with respect to the connector element 20b, so that only the pins 35 in the connector element 20a are visible.

Furthermore, in the housing 21 there is formed a seat 37 on which the spherical lens 23 is clamped. Lens 23 is clamped by means of the lens clamp 25. Lens clamp 25 in turn is clamped in a groove 39. Groove 39 is coplanar with a rim 80, both being parallel to a reference end face 22. In the connector element 20a the lens clamp 25 is only diagrammatically shown and the groove has been omitted for the sake of clarity.

Before assembling a connector element 20a or 20b, a fiber end 41 is glued into a capillary tube 43 which in turn is secured in the fiber holder 31 by means of a setting epoxy resin. Furthermore, the optical fiber 45 is strain-relieved by means of a clamping bushing 47 and a clamping nut 49 which is screwed onto a threaded stud 32 of the fiber holder 31. The split cap 51 of the clamping bushing 47 is then clamped onto the secondary jacket of the fiber 45.

Next, the fiber holder 31 is pressed against the rim 80 via a cup spring 27 (or resilient ring 29) arranged on the lens clamp 25 and the adjusting ring 33 is screwed into the housing 21. After assembling each connector element 20a and 20b, the fiber end 41 in each connector element should be positioned with respect to the lens 23. This process will be described with reference to FIG. 3.

Figure 2B:
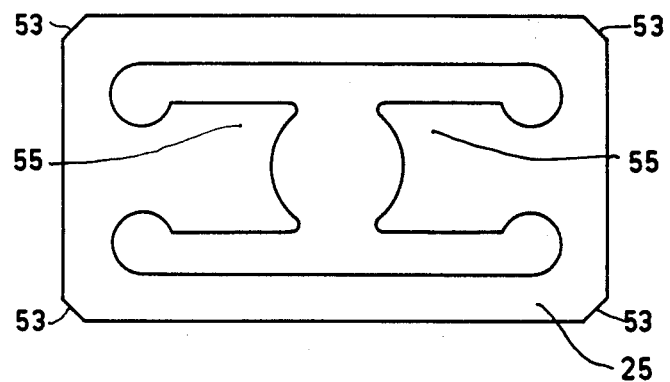

FIG. 2b is a view (at an increased scale) of the lens clamp 25 which is clamped into the groove 39 at four corners 53. The resilient arms 55 exert only a small pressure on the lens 23 (0.5 N), so that the lens 23 is not distorted by mechanical forces.

Figure 3:
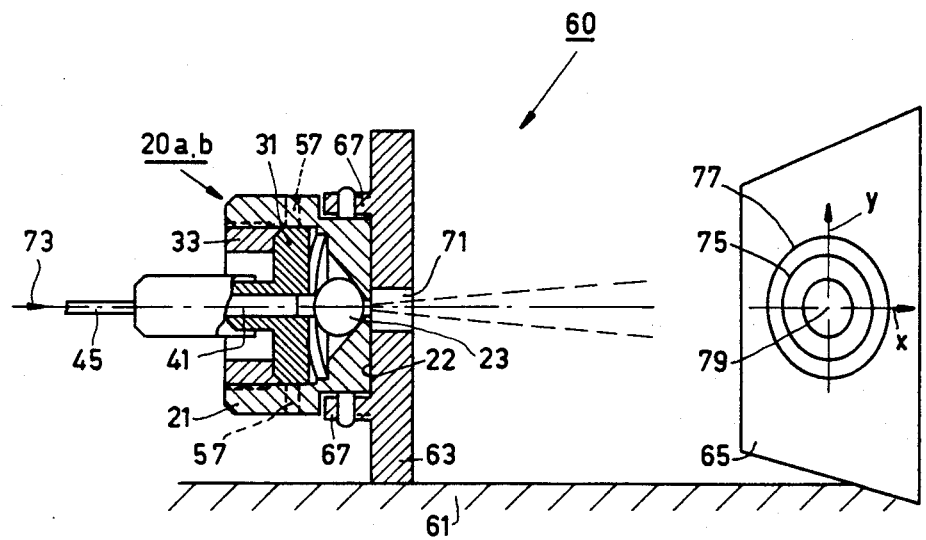
FIG. 3 is a partly perspective, partly sectional and partly schematic view of a device for aligning an end of a fiber with respect to a central axis of a connector element of the connector according to the invention.

FIG. 3 shows a device 60 for adjusting the position of a fiber end 41 in a connector element 20a or 20b of a connector 20 as shown in FIG. 2a. Fiber end 41 is adjusted with respect to the spherical lens 23. The adjustment involves the steps of positioning the fiber end 41 at the correct radial distance from the spherical lens and positioning the fiber end 41 on the optical axis of the spherical lens.

The device 60 comprises a base plate 61 on which there are mounted a holder 63 and, at a distance therefrom, a screen 65. On the holder 63 there is formed a rim 67 in which the connector element 20a or 20b is arranged and secured by means of the bayonet connection. The holder 63 further comprises a bore 71 which is concentric to the rim 67. The origin 79 of a system of coordinates X-Y in the target 77 is situated on an axis which is directed transverse to the plane bounded by the rim 67 and which extends through the center of the bore 71. The plane bounded by the rim 67 is the abutment plane for the reference end face 22 of the connector element 20a or 20b.

Light radiated into the optical fiber 45 (denoted by the arrow 73) is projected onto the screen 65 via the spherical lens 23. The adjusting ring 33 is tightened, so that the fiber holder 31 with the fiber end 41 is pressed toward the spherical lens 23. From the projection 75 of the light emitted by the spherical lens 23 on the screen 65 it can be determined when the light-emitting end 41 has been positioned sufficiently accurately at the focal point of the spherical lens 23.

After adjusting the distance between the fiber end 41 and the lens 23 by means of adjusting ring 33, the fiber holder 31 is displaced parallel to the reference end face 22 in two perpendicular directions by positioning means in the form of positioning screws 57. The image projected onto the screen 65 via the lens 23 can thus be symmetrically positioned with respect to the target drawn on the screen 65. When the image is symmetric, the fiber end 41 is positioned on the optical axis of the spherical lens 23.

What is claimed is:

1. A detachable connector for coupling a pair of optical fibers comprising:

two connector elements, each connector element comprising:

a cylindrical housing having a reference end face and having a circularly cylindrical bore extending from the reference end face and transverse thereto, said bore having an axis and beginning with a narrow portion at the reference end face and widening with increased axial distance from the reference end face to form a conical seat and to form a rim which is parallel to the reference end face;

a spherical lens accomodated in the widening portion of the bore in the housing;

a disc-shaped fiber holder having a flat side and a bore for accomodating an end of an optical fiber, the bore being perpendicular to the flat side, said fiber holder being arranged in the bore of the housing to slide along the axis;

means for adjusting the axial displacement of the fiber holder;

means for adjusting the displacement of the fiber holder parallel to the reference end face; and a lens clamp, secured in a groove in the housing, for securing the lens in the conical seat;

said detachable connector further comprising:

a connector holder; and means for detachably connecting each connector element to the connector holder such that the reference end faces of the connector elements contact each other.

2. A detachable connector as claimed in claim 1, characterized in that the axial adjusting means comprises:

a resilient member between the fiber holder and the rim, said resilient member forcing the fiber holder away from the rim; and an adjusting ring screwed into the bore of the housing to press the fiber holder against the resilient member.

3. A detachable connector as claimed in claim 2, characterized in that the means for adjusting the displacement of the fiber holder parallel to the reference end face comprises at least three positioning screws arranged in the housing to bear on the fiber holder.

* * * * *